United States Patent [19]
Hannum

[11] Patent Number: 5,806,658
[45] Date of Patent: Sep. 15, 1998

[54] COMPOSITE NON-METALLIC AND METALLIC CHAIN FOR WATER TREATMENT SYSTEMS

[75] Inventor: Joseph R. Hannum, Blue Bell, Pa.

[73] Assignee: Polychem Corporation, Phoenixville, Pa.

[21] Appl. No.: 639,769

[22] Filed: Apr. 29, 1996

[51] Int. Cl.[6] .................................................. F16G 13/06
[52] U.S. Cl. ......................... 198/731; 198/733; 474/207; 474/231
[58] Field of Search .................................. 198/731, 733; 474/207, 231, 206, 202

[56] References Cited

U.S. PATENT DOCUMENTS

| | | | |
|---|---|---|---|
| 336,921 | 3/1886 | Jeffrey | 474/207 |
| 447,813 | 3/1891 | Elliott | 474/207 |
| 2,816,453 | 12/1957 | Frank et al. | 474/207 |
| 3,091,325 | 5/1963 | Klemme | 198/731 |
| 3,206,258 | 9/1965 | Heinrich | 474/207 |
| 3,616,707 | 11/1971 | Ivashkdv et al. | 474/207 |
| 4,123,947 | 11/1978 | Smith et al. | 59/9 |
| 4,271,663 | 6/1981 | Templin et al. | 474/207 |
| 4,645,598 | 2/1987 | Hannum . | |
| 4,766,997 | 8/1988 | Hannum . | |
| 4,810,383 | 3/1989 | Hannum . | |
| 4,863,418 | 9/1989 | Filler et al. | 474/207 |
| 5,226,856 | 7/1993 | Iacchetta et al. | 474/207 |
| 5,269,729 | 12/1993 | Thuerman et al. | 474/207 |
| 5,295,917 | 3/1994 | Hannum . | |
| 5,336,417 | 8/1994 | Hannum . | |

OTHER PUBLICATIONS

The Bud Company, "Engineered Plastic Conveyor Components", 4 pages, Undated.
Hitachi Maxco, Ltd., "Environmental Products", 4 pages, Undated.
Hitachi Maxco, Ltd., "Product Bulletin SAV 715 Stainless", 2 pages, Undated.
Hitachi Maxco, Ltd., "Product Bulletin HB–78 Stainless", 2 pages, undated.
Rex Chains, "Rex Loop Chain For Heavy Duty Sludge Collector Service", 4 pages, Sep., 1986.
The Budd Company, "Non–Metallic Rectangular Clarifier Components For Water And Wastewater Treatment Applications", 12 pages, Sep., 1989.
Polychem Corporation, "Polychem Engineered Non–Metallic NCS–720–S Chain; Cast Nylon Sprockets & Corrosion Resistant Systems & Components", 4 pages, Jun., 1995.

Primary Examiner—Karen M. Young
Assistant Examiner—Douglas Hess
Attorney, Agent, or Firm—Harness, Dickey & Pierce, P.L.C.

[57] ABSTRACT

In accordance with the teachings of the present invention, a composite non-metallic and metallic chain for use in a waste water treatment system is provided. The chain includes a plurality of non-metallic chain link barrel connecting elements including central teeth receiving portions. Each of the barrel elements include first and second end portions extending from opposite ends of the teeth receiving portion. A plurality of metallic side bar members interconnect the non-metallic barrel elements and are rotatably coupled to the end portions of the barrel elements. A plurality of non-metallic bearing members are disposed about the end portions of the barrel elements between adjacent metallic side bar members for reducing friction and wear between the adjacent side bar members. A plurality of non-metallic clip members are secured with indentations formed in the end portions of the barrel elements for securing the metallic side bar members thereto.

19 Claims, 4 Drawing Sheets

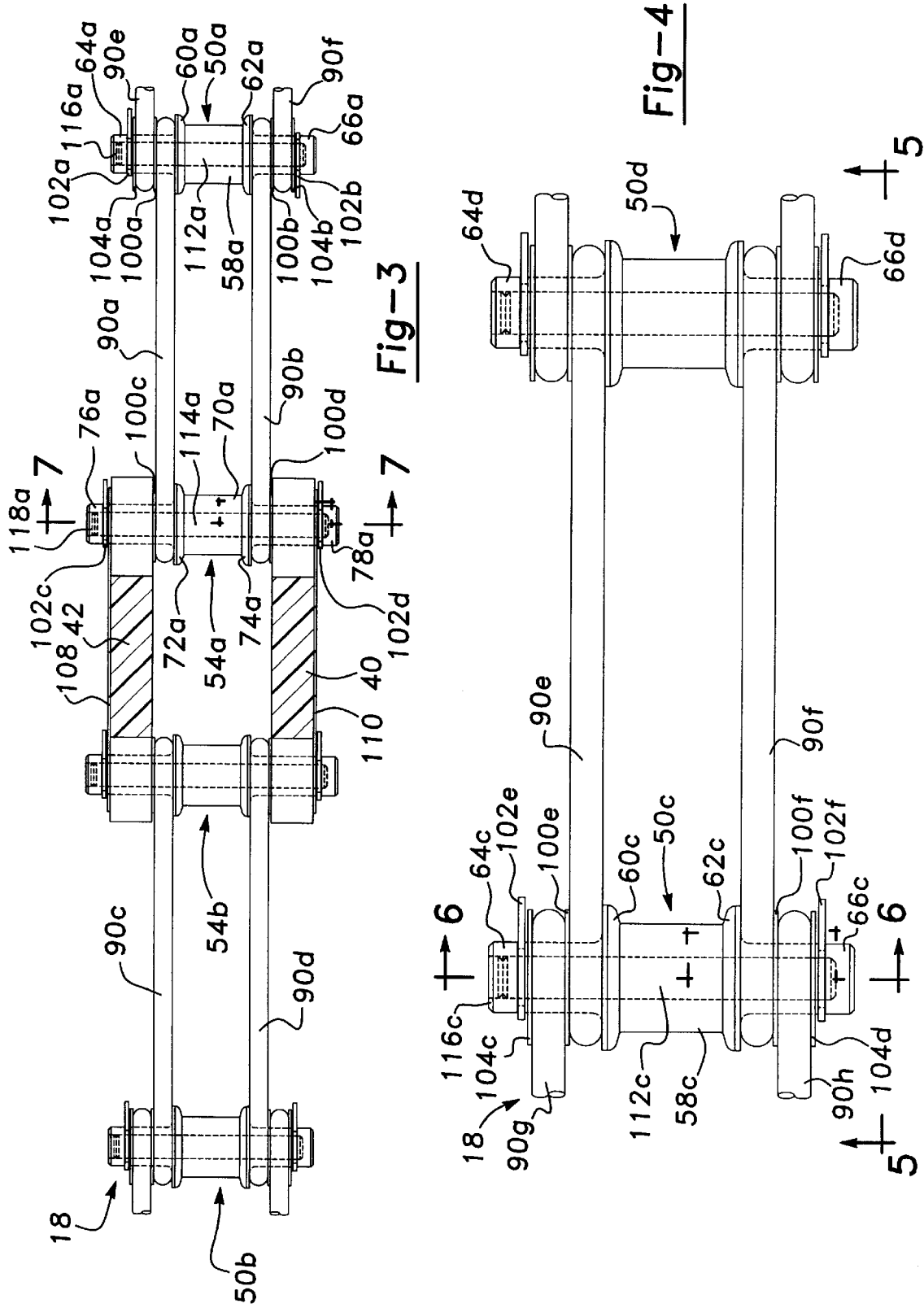

COMPOSITE NON-METALLIC AND METALLIC CHAIN FOR WATER TREATMENT SYSTEMS

BACKGROUND OF THE INVENTION

1. Technical Field

This invention relates to conveyor chains and, more particularly, to a conveyor chain for use in a corrosive environment such as a waste water treatment system.

2. Discussion of The Related Art

The use of conveyor chains in waste water treatment systems are generally known in the art. Conveyor chains are commonly employed in waste water treatment systems in conjunction with sprocket members in order to remove waste solids such as grit (i.e. non-biodegradable solids such as stones, sand, or glass), sludge and scum from waste water. Examples of such waste water treatment systems are bar screen assemblies, grit removal assemblies, and sludge and scum removal assemblies. Conveyor chains employed in such systems are commonly subjected to high stress loads, excessive wear between components, and the corrosive effects of the waste water environment, all of which reduce the useful life of the conveyor chains.

For example, a waste water treatment system often employs a settling tank including a series of drag flight members that are carried and driven by a pair of parallel chains that are, in turn, driven by sprocket members. As the flight members move throughout the tank removing waste solids, the flight members and the sprocket members' teeth are subjected to high stress loads that may be transferred to the individual components of the chains. Additionally, the corrosiveness of the waste water in the tank may have adverse effects on the components of the chains which, in turn, may increase failure rates within the system.

In an attempt to overcome such problems associated with the conveyor chains utilized in waste water treatment systems, a chain's components such as barrel elements, chain links, and other associated hardware are typically all formed from stainless steel or plastic materials. An advantage with the use of stainless steel chain components are their high strength characteristics but at the cost of increased weight, susceptibility to corrosion, high maintenance requirements due to excessive wear, and high costs. Conversely, the advantages of plastic chain components are their reduced weight, high immunity to corrosion, reduced maintenance requirements and relatively low costs. However, plastic chain components may have limited strength characteristics which may result in failures when subjected to high stress loads. Unfortunately, the use of either a conveyor chain comprised entirely of steel components or a conveyor chain comprised entirely of plastic components within a water treatment system requires compromises between the above-described characteristics of both forms of conveyor chains.

It is therefore desirable to provide a conveyor chain for use in a corrosive environment that has reduced weight, wear and cost compared to a conveyor chain made entirely from steel components and that has increased strength characteristics compared to a conveyor chain made entirely from plastic components.

More particularly, it is desirable to provide a composite non-metallic and metallic chain for use in a waste water treatment system that includes integrally molded one-piece construction non-metallic chain link barrel connecting elements interconnected by metallic chain link side bar members.

It is further desirable to provide a composite plastic and stainless steel chain requiring less hardware per foot when compared to prior conveyor chain designs.

SUMMARY OF THE INVENTION

In accordance with the teachings of the present invention, a composite non-metallic and metallic conveyor chain for use in water treatment systems and exhibiting high strength characteristics, high wear characteristics and high immunity to the effects of exposure to corrosive environments is disclosed. The conveyor chain is comprised of both stainless steel and plastic components for minimizing the chain's weight, the coefficient of friction and wear between the chain's components, and corrosion while maximizing the chain's strength characteristics and energy efficiency.

In accordance with the teachings of one embodiment of the present invention, a conveyor chain for use in water treatment system includes a plurality of interconnected non-metallic chain link barrel connecting elements. Each of the barrel elements includes a central portion for receiving the teeth of at least one sprocket and first and second end portions projecting from the opposite ends of the central portion. A plurality of metallic side bar members for interconnecting the plurality of non-metallic barrel elements are rotatably coupled to the first and second end portions of the non-metallic barrel elements.

In accordance with a preferred embodiment, a plurality of non-metallic snap-lock clip members are secured within indentations formed in the first and second end portions of the interconnected non-metallic barrel elements for securing the metallic side bar members thereto.

In accordance with another preferred embodiment, a plurality of non-metallic bearing members are disposed about the first and second end portions of the non-metallic barrel elements between adjacent metallic side bar members for minimizing friction and wear between the adjacent side bar members.

In accordance with another preferred embodiment, metallic rod members are encapsulated within the non-metallic barrel elements for increasing the strength of the barrel elements.

BRIEF DESCRIPTION OF THE DRAWINGS

The various advantages of the present invention will become apparent to those skilled in the art after reading the following specification and by reference to the drawings in which:

FIG. 3 is a partial top view, along line 3—3 of FIG. 2, of the composite non-metallic and metallic chain illustrating an integrated flight attachment link in accordance with the teachings of the present invention;

FIG. 4 is a partial top view, along line 4—4 of FIG. 2, of the composite non-metallic and metallic chain in accordance with the present invention;

DETAILED DESCRIPTION OF THE PREFERRED EMBODIMENTS

The following description of the preferred embodiments is merely exemplary in nature and is in no way intended to limit the invention or its application or uses.

The present invention is particularly concerned with providing a conveyor chain for use in a waste water treatment system. The conveyor chain will be described as part of a sludge and scum removal drag flight assembly employed in a rectangular clarifier or settling tank partially filled with waste water. However, the present invention is not limited to such an application and may be used in conjunction with other types of water treatment systems including, but not limited to, bar screen assemblies, grit removal assemblies, and other types of sludge and scum removal assemblies requiring conveyor chains having sufficient strength characteristics, wear characteristics and immunity to corrosive environments.

Figure 1:
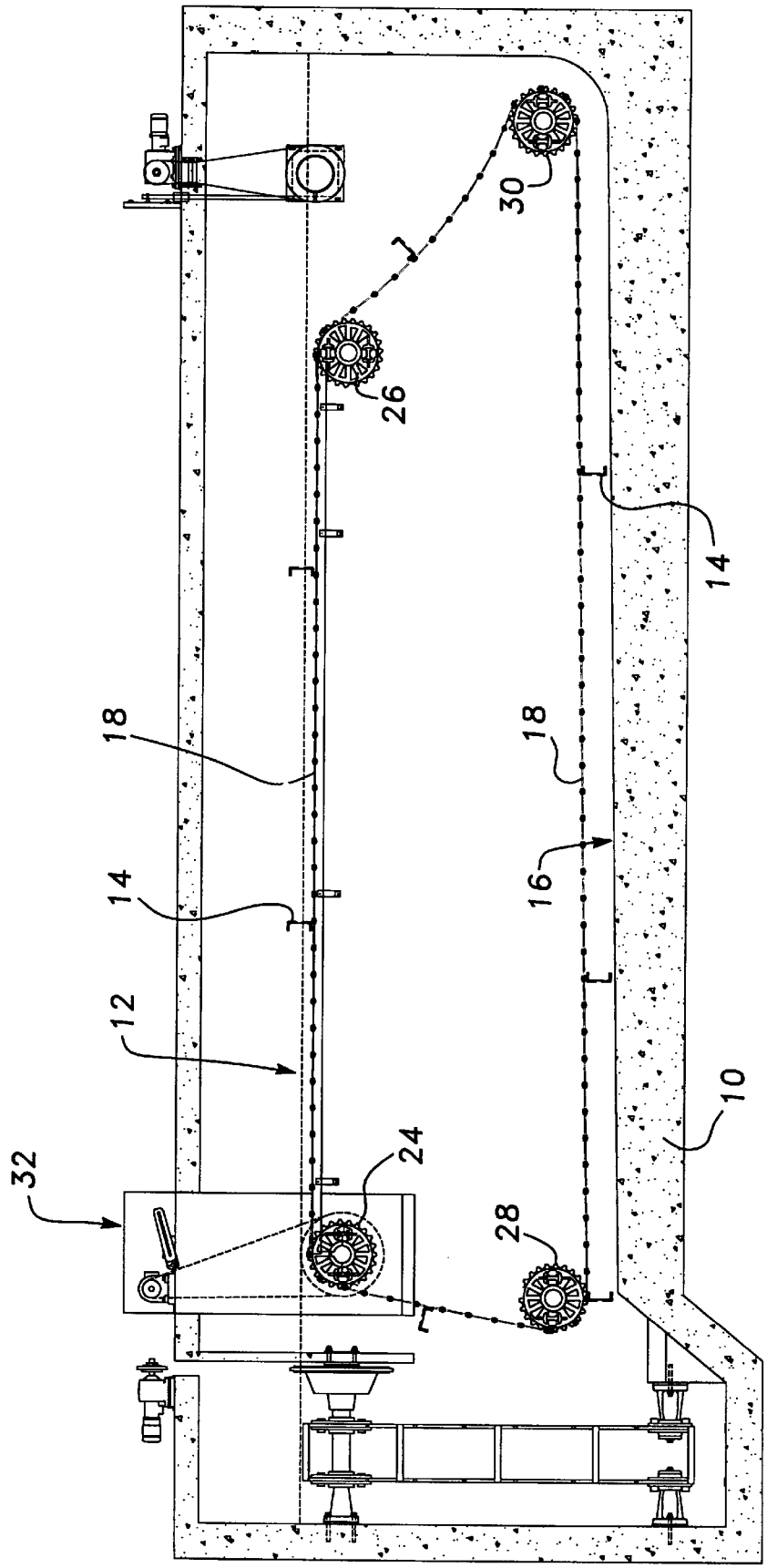
FIG. 1 is a cut away side view of a waste water treatment system's settling tank containing a drag flight conveyor assembly employing the composite non-metallic and metallic chain in accordance with the teachings of the present invention.

Referring to FIG. 1, a settling tank 10 partially filled with waste water, containing sludge and scum, up to a waste water level 12 is illustrated. A series of drag flight members 14 are adapted for moving longitudinally across the tank 10 to skim the top surface of the waste water in order to collect scum and for moving along the bottom surface 16 of the tank 10 to collect sludge for removal. The flight members 14 are carried and driven by a pair of conveyor chains of which only chain 18 is shown in this view. The chain 18 is carried and driven by a drive sprocket 24 and idler sprockets 26, 28 and 30. The drive sprocket 24 in turn is driven by a conventional drive assembly represented by box 32. In accordance with a preferred embodiment, the chain has a pitch of 8.875 inches and the sprockets 24, 26, 28, and 30 all have pitches of 6 inches, which is an industry standard for sprockets employed in this type of water treatment system. The advantage of the chain 18 having a pitch of 8.875 inches is that it requires less links per foot length compared to an international standard 6 inch pitch chain such as NCS-720-S non-metallic 6 inch pitch chain available from Polychem Corporation. For example, a 100 foot length of such a 6 inch pitch chain requires approximately 200 links and the links' associated hardware. As will be described in detail below, this is compared to only approximately 135 barrel elements and associated hardware for the chain 18. This reduction of hardware reduces the cost per foot of the chain 18.

Figure 2:
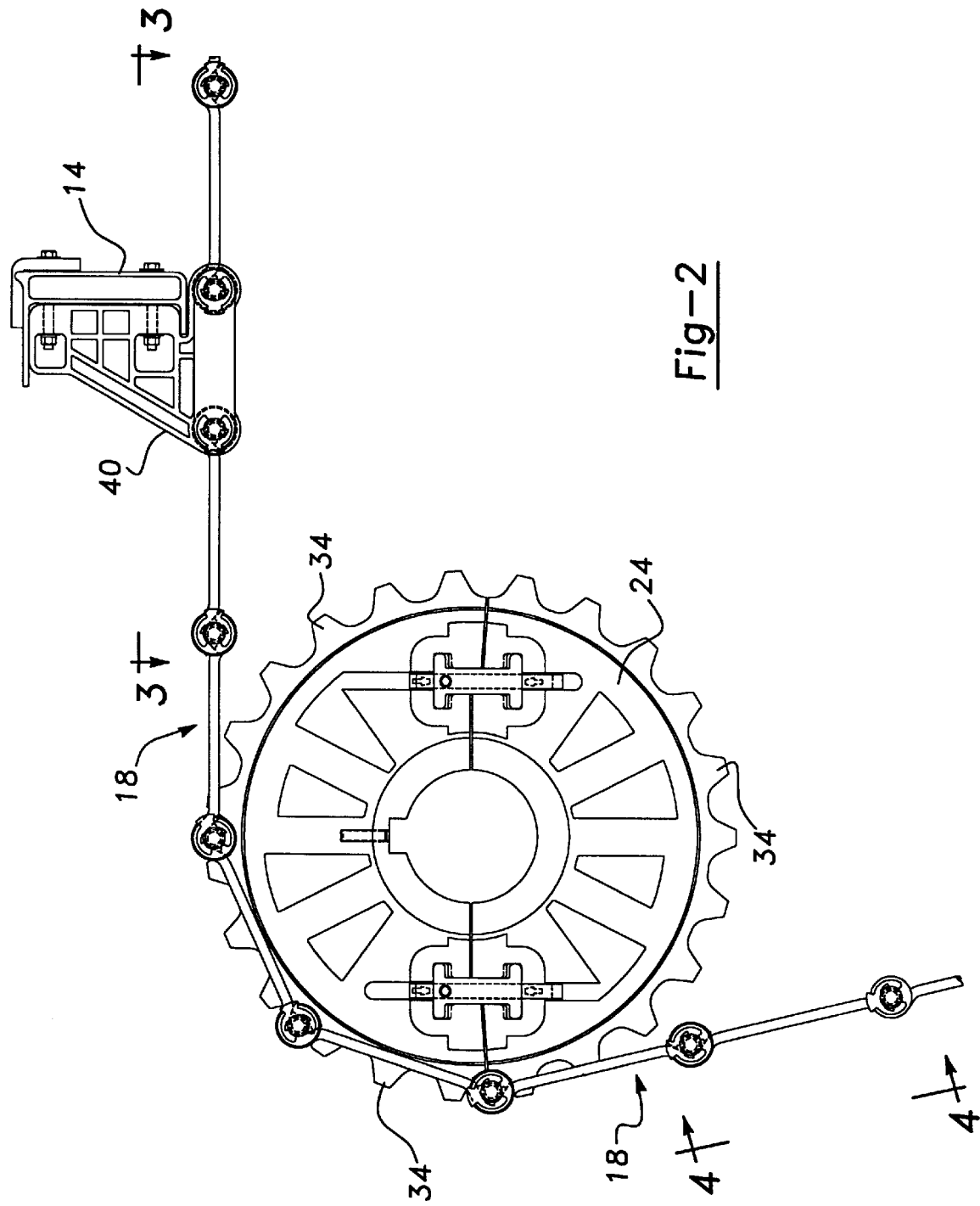
FIG. 2 is a partial view of the composite non-metallic and metallic chain engaging the teeth of a sprocket which is part of the drag flight conveyor assembly in accordance with the teachings of the present invention.

Turning to FIG. 2, a section of chain 18 is illustrated being driven by the teeth 34 of the drive sprocket 24. Preferably, the sprocket 24 is of a split sprocket design disclosed in commonly assigned U.S. Pat. No. 5,295,917 to Hannum, which is hereby incorporated by reference. Also shown is one of the flights 14 coupled to the chain 18 by a pair of plastic attachment links of which only attachment link 40 is visible in this view.

Turning to FIG. 3, a top view of a section of the chain 18, along line 3—3 of FIG. 2, is shown. This view illustrates the manner in which the attachment link 40 and a second attachment link 42 are integrated as part of the chain 18. The section of the chain 18 shown in this view includes identical integrally molded one-piece non-metallic chain link barrel elements 50a and 50b as well as identical non-metallic chain link barrel connecting elements 54a and 54b that are all configured for receiving the teeth 34 of the sprocket 24. With respect to this section of the chain 18, only barrel elements 50a and 54a will be described in detail. Preferably, the non-metallic barrel elements 50a and 54a are of a molded one-piece construction and are made of a non-metallic material such as a self lubricating engineered plastic resin material which may be a thermoplastic or thermoset resin. Such construction provides self lubrication of the barrel elements and compared to prior steel barrel elements, reduces the wear of the barrel elements which increases the useful life of the chain 18. Additionally, other plastic materials including cast Nylon-6 which may be glass reinforced for maximum strength and wear resistance characteristics may be used. The barrel element 50a includes a central portion 58a with tapered side walls 60a and 62a for receiving the teeth 34 of the sprocket 24. End portions 64a and 66a project from opposite ends of the central portion 58a. Similarly, the non-metallic barrel element 54a includes a central portion 70a with tapered side walls 72a and 74a and includes end portions 76a and 78a projecting from opposite ends of the central portion 70a. The central portion 70a is also configured for receiving the teeth 34 of the sprocket 24. As illustrated in this view, the difference between barrel element 50a and 54a is that the end portions 76a and 78a are longer then end portions 64a and 66a.

Barrel elements 50a and 54a are interconnected by metallic side bar members 90a and 90b which lie essentially parallel to one another. The side bar member 90a is rotatably coupled to the end portion 76a of the barrel element 54a as well as the end portion 64a of the barrel element 50a. Likewise, the side bar member 90b is rotatably coupled to the end portion 78a of the barrel element 54a and the end portion 66a of the barrel member 50a. As will be apparent to one skilled in the art, metallic side bar members 90c and 90d are rotatably coupled in a similar fashion between barrel elements 50b and 54b.

Figure 8:
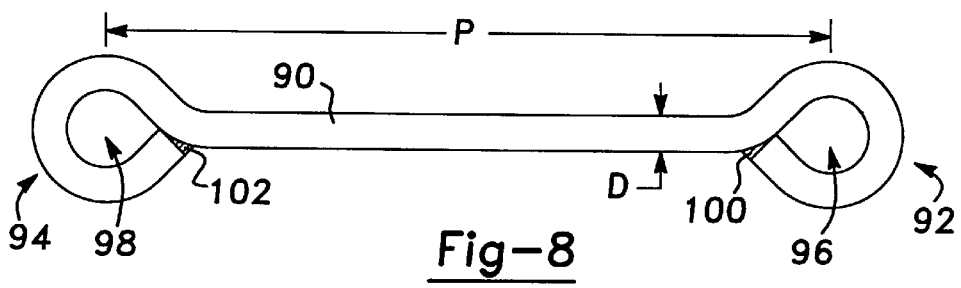
FIG. 8 is a side view of a representative metallic side bar member of the composite non-metallic and metallic chain in accordance with the teachings of the present invention.

With reference to FIG. 8, a representative metallic side bar member 90 for the chain 18 is shown. The side bar member 90 includes opposite ends 92 and 94 which are formed as closed loops with apertures 96 and 98 configured for receiving the end portions of the non-metallic barrel elements of the chain 18. As illustrated, the side bar member 90 is formed from a continuous piece of steel which has been formed and welded. Each of the ends 92 and 94 includes welded portions 100 and 102 which complete the continuous loops. The side bar member 90 is preferably made from stainless stain chain link for attaining maximum tensile strength. Preferably, the side bar member 90 is made from 400 series stainless steel but could also be formed from rust protected high tensile steel and the like. Additionally, the side bar member 90 could be formed from casted steel which would not require welded portions 100 and 102 to complete the loops.

The side bar 90 preferably has a diameter D of 0.438 inches. However, depending upon the working loads which the chain 18 is subjected to, the diameter D may be minimized for a specific application in order to reduce the overall weight of the chain 18 while retaining sufficient strength characteristics. As will be apparent to one skilled in the art, when compared to plastic chain links, the use of metallic side bar members side bar member 90 offers flexibility in designing the chain 18 for a particular application. The side bar member 90 has a pitch P of 8.875 inches and is compatible for use on a standard 6 inch pitch sprocket as illustrated in FIG. 2.

Returning to FIG. 3, an additional side bar member 90e is rotatably coupled to end portion 64a of barrel element 50a and lies adjacent to side bar member 90a. Likewise, another side bar member 90f is rotatably coupled to the end portion 66a and lies adjacent to side bar member 90b. The side bar members 90e and 90f are also rotatably coupled to another barrel element of the chain 18.

In order to minimize friction and wear between adjacent side bar members of the chain 18, thrust bearing washers 100a and 100b are disposed about end portions 64a and 66a between the side bar members 90a and 90e and between side bar members 90b and 90f respectively. Non-metallic snap-lock clip members 102a and 102b are secured to the end portions 64a and 66a for securing and preventing axial movements of the side bar members 90a and 90e as well as 90b and 90f about the end portions 64a and 66a. Additional, non-metallic thrust bearing washers 104a and 104b are disposed about end portions 64a and 66a between side bar member 90e and the clip member 102a as well as about end portion 66a between clip member 102b and side bar member 90f in order minimize friction and wear between the same.

In a similar fashion, non-metallic bearing washers 100c and 100d are disposed on end portions 76a and 78a between the attachment link 42 and the side bar member 901a as well as between attachment link 40 and side bar member 90b. Non-metallic snap-lock clip members 102c and 102d are secured to end portions 76a and 78a for securing and preventing axial movements of the attachment links 40 and 42 and side bar members 90a and 90b about the end portions 76a and 78a. As will be apparent to one skilled in the art, attachments links 40 and 42 are rotatably coupled and secured to barrel element 54b in a similar manner.

In accordance with a preferred embodiment, in order to increase the tensile strength of the attachment links 40 and 42, metallic plate members 108 and 110, lying parallel to attachment links 42 and 40, are rotatably coupled to the end portions of barrel elements 54a and 54b. Depending upon the specific application in which the chain 18 is used, the plates 108 and 110 may be omitted in order to reduce the overall weight of the chain 18.

In order to increase the tensile strength of the barrel elements 54a and 50a, as well as the other barrel elements in the chain 18, metallic pin members 112a and 114a are encapsulated by and axially extend through the barrel elements 50a and 54a. Plug members 116a and 118a are secured to end portions 64a and 76a for enclosing and insulating, the pin members 112a and 114a from the corrosive environment within the tank 10. As with the plate members 108 and 110, the pin members 112a and 114a may be omitted in order to reduce the overall weight of the chain 18.

With reference to FIG. 4, a top view of a section of the chain 18 along line 4—4 of FIG. 2 is illustrated. This section of the chain 18 includes identical non-metallic chain link barrel connecting elements 50c and 50d that are also configured for receiving the teeth 34 of the sprocket 24. The barrel elements 50c and 50d are identical to barrel elements 50a and 50b described above with reference to FIG. 3. This view illustrates the manner in which the barrel elements 50c and 50d, as well as the other barrel elements of the chain 18 without the attachment links, are interconnected to one another. As will be apparent to one skilled in the art, the chain 18 comprises numerous other barrel elements that are interconnected as shown in this view. Because the barrel elements 50c and 50d are identical to one another, only barrel element 50c will be described in detail.

Again, the non-metallic barrel elements 50c and 50d are of a molded one-piece construction and are made of a non-metallic material such as, but not limited to, plastic materials for improved wear resistance characteristics. The barrel element 50c includes a central portion 58c with tapered side walls 60c and 62c for receiving the teeth 34 of the sprocket 24. End portions 64c and 66c project from opposite ends of the central portion 58c. Barrel elements 50c and 50d are interconnected by metallic side bar members 90e and 90f which lie essentially parallel to one another and are configured as shown in FIG. 8. The side bar member 90e is rotatably coupled to the end portion 64c of the barrel element 50c as well as to an end portion 64d of the barrel element 50d. Likewise, the side bar member 90f is rotatably coupled to the end portion 66c of the barrel element 50c and an end portion 66d of the barrel element 50d. In order to interconnect the barrel element 50c to another barrel element not shown in this view of the chain 18, additional side bar members 90g and 90h are rotatably coupled to the end portions 64c and 66c. As discussed above, in order to reduce friction and wear between adjacent side bar members of the chain 18, non-metallic thrust bearings washers 100e and 100f are disposed about end portions 64c and 66c between the side bar members 90e and 90g as well as between 90f and 90h respectively. Non-metallic snap-lock clip members 102e and 102f are secured to end portions 64c and 66c in order to secure and prevent axial movements of the side bar members 90e and 90g as well as 90f and 90h about end portions 64c and 66c. Additional non-metallic thrust bearing washers 104c and 104d are disposed about end portions 64c and 66c between the side bar member 90g and clip member 102e as well as between side bar member 90h and clip member 102f in order to reduce friction and wear between the same. In accordance with a preferred embodiment, a metallic pin member 112c is encapsulated and axially extends through the barrel element 50c in order to increase the tensile strength of the barrel element 50c. A plug member 116c encloses and insulates the pin member 112c from the corrosive environment with the tank 10.

Figure 5:
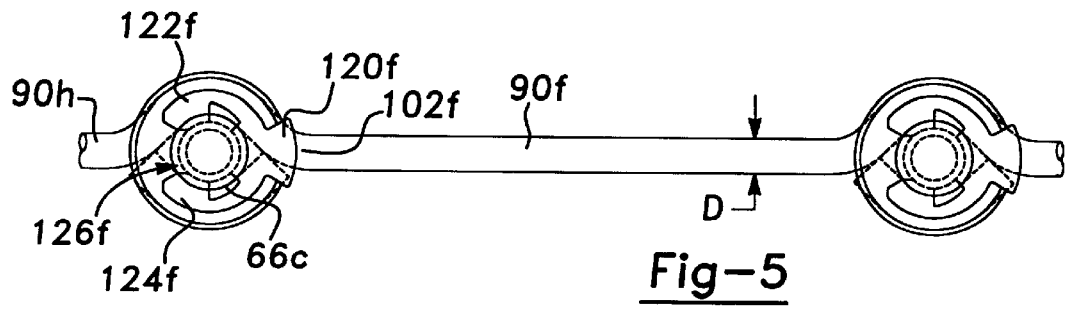
FIG. 5 is a partial side view, along line 5—5 of FIG. 4, of the composite non-metallic and metallic chain in accordance with the present invention.

Turning to FIG. 5, a side view of a section of the chain 18 along line 55 of FIG. 4 is illustrated. Because side bar members 90f and 90e lie parallel to one another, only side bar member 90f is visible from this view. From this view, non-metallic snap-lock clip member 102f is illustrated including a tab section 120f and opposing arm sections 122f and 124f. The arm sections 122f and 124f are snap fitted within an indentation 126f formed in end portion 66c. In order to remove the clip member 102f from the end portion 66c, a tool, such as a pair of pliers, engages the tab member 120f for its removal. Also illustrated in this view is the diameter D of the side bar member 90f which remains constant throughout the chain 18.

Figure 6:
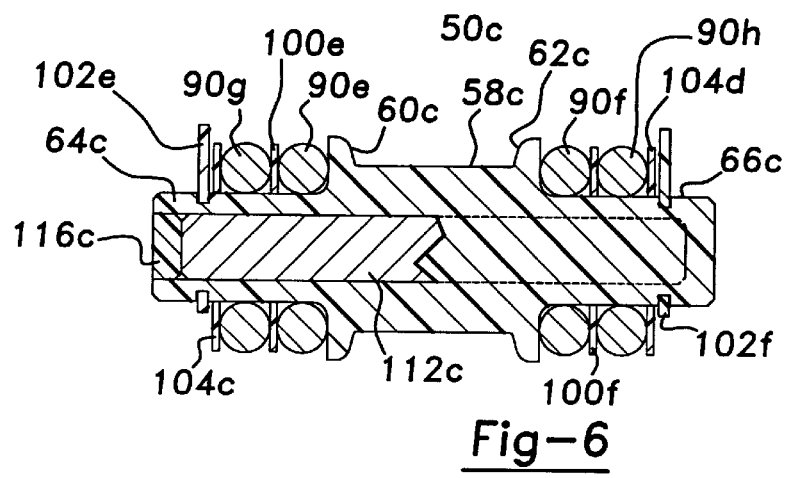
FIG. 6 is a cross sectional view, along line 6—6 of FIG. 4, of the composite non-metallic and metallic chain in accordance with the present invention.

With reference to FIG. 6, a cross section view through the barrel element 50c, along line 6—6 of FIG. 4, is shown. From this view, a portion of the pin member 112c is shown encapsulated by the barrel element 50c and plug member 116c. Also illustrated are the locations of thrust bearing washer members 104c, 100e, 100f and 104d disposed about the end portions 64c and 66c.

Figure 7:
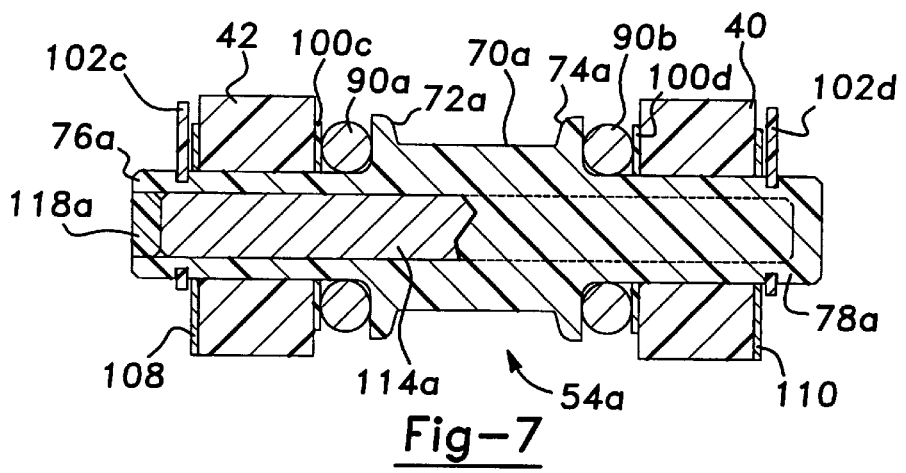
FIG. 7 is a cross sectional view, along line 7—7 of FIG. 3, of the composite non-metallic and metallic chain in accordance with the present invention.

Turning to FIG. 7, a cross section view along line 7—7 of FIG. 3 is illustrated. The pin member 114a is shown encapsulated by the barrel element 54a and plug member 118a for strength purposes. From this view, the locations of thrust bearing washer members 100c and 100d as well as plates 108 and 110 are shown.

In operation, the use of the metallic side bar members 90*a*–90*h* in conjunction with non-metallic chain link barrel connecting elements 50*a*–50*d* as well as 54*a* and 54*b* allows the chain 18 to move efficiently about the sprocket members 24–30 within the tank 10 with reduced wear. Additionally, the combination of metallic and non-metallic components minimizes the overall weight of the chain 18 without sacrificing needed strength characteristics including working load, proof load, stress load and minimum ultimate tensile load. Additionally, the addition of the pin members 112*a* through 112*c* increases the strength characteristics of the barrel elements as well as the overall chain 18 when required for a particular application. Moreover, the ability to select different diameters (D) of the side bar members allows the chain 18 to have desired strength characteristics while minimizing the overall weight and therefore the energy efficiency of the chain 18.

From the foregoing, it can be seen that compared to prior conveyor chains formed entirely from steel or plastic components, the composite non-metallic and metallic chain 18 of the present invention minimizes the overall weight of the chain 18 while retaining high strength an wear characteristics required for a particular application. An additional advantage of the present invention is that the chain 18 is highly resistant to the corrosive environments within the tank 10 and has high energy efficiency due to the combination of non-metallic and metallic components and which will ultimately extend the useful life of the chain 18.

The foregoing discloses and describes merely exemplary embodiments of the present invention. One skilled in the art will readily recognize from such discussion and from the accompanying drawings and claims, that various changes, modifications and variations can be made therein without departing from the spirit and scope of the present invention as defined by the following claims.

What is claimed is:

1. A conveyor chain for a water treatment system having a tank with a plurality of sprockets disposed therein, said chain comprising:

a plurality of non-metallic chain link barrel connecting means for receiving teeth of the sprockets;

a plurality of metallic interconnecting means for interconnecting the plurality of non-metallic chain link barrel connecting means; and a plurality of non-metallic locking means for securing the metallic interconnecting means to the non-metallic chain link barrel connecting means, wherein said plurality of non-metallic chain link barrel connecting means and said plurality of metallic interconnecting means forms a chain for carrying drag flight members through the tank of said water treatment system.

2. The chain of claim 1, wherein the non-metallic chain link barrel connecting means includes:

a plurality of metallic pin members encapsulated by the non-metallic chain link barrel connecting means for increasing the strength of the non-metallic chain link barrel connecting means.

3. The chain of claim 1, further comprising:

non-metallic bearing means, disposed about the non-metallic chain link barrel connecting means and interposed between the metallic interconnecting means, for reducing friction and wear between the metallic interconnecting means.

4. A conveyor chain for a water treatment system having a tank with a plurality of sprockets disposed therein, said chain comprising:

a plurality of interconnected non-metallic chain link barrel connecting elements for receiving teeth of the sprockets; and a plurality of metallic interconnecting means for interconnecting the plurality of non-metallic chain link barrel connecting elements, each of the plurality of non-metallic chain link barrel connecting elements including:

a central portion for receiving the teeth of the at least one sprocket; and first and second end portions projecting beyond said plurality of metallic interconnecting means from opposite ends of the central portion.

5. The chain of claim 4, further comprising:

a plurality of metallic pin members axially extending through and encapsulated by the plurality of interconnected non-metallic chain link barrel connecting elements for increasing the strength of the conveyor chain.

6. The conveyor chain of claim 4, wherein the plurality of metallic interconnecting means includes:

a plurality of metallic side bar members for interconnecting the plurality of non-metallic chain link barrel connecting elements;

a first of the metallic side bar members rotatably coupled to the first end portions of a first and a second of the non-metallic chain link barrel connecting elements; and a second of the metallic side bar members rotatably coupled to the second end portions of the first and second chain link barrel connecting elements.

7. The chain of claim 6, further comprising:

a third of the metallic side bar members rotatably coupled to the first end portion of the first non-metallic chain link barrel connecting element; and a fourth of the metallic side bar members rotatably coupled to the second end portion of the first non-metallic chain link barrel connecting element.

8. The chain of claim 7, wherein the third metallic side bar member is rotatably coupled to a first end portion of a third of the non-metallic chain link barrel connecting elements and the fourth metallic side bar member is rotatably coupled to a second end portion of the third non-metallic chain link barrel connecting element.

9. The chain of claim 7, further comprising:

a first non-metallic bearing member disposed about the first end portion of the first non-metallic chain link barrel connecting element between the first and third metallic side bar members; and a second non-metallic bearing member disposed about the second end portion of the first non-metallic chain link barrel connecting element between the second and fourth metallic side bar members, whereby the first and second non-metallic bearing members reduce friction and wear between the first and third and the second and fourth metallic side bar members.

10. The chain of claim 7, further comprising:

a plurality of non-metallic clip members secured within indentations in the first and second end portions of the plurality of interconnected non-metallic chain link barrel connecting elements.

11. The chain of claim 10, further comprising:

a third non-metallic bearing member disposed about the first end portion of the first chain link barrel connecting element between the third metallic side bar member and a first of the non-metallic clip members; and a fourth non-metallic bearing member disposed about the second end portion of the first chain link barrel connecting element between the fourth metallic side bar member and a second of the non-metallic clip members, whereby the third and fourth non-metallic bearing members reduce friction and wear between the third metallic side bar member and the first non-metallic clip member and the fourth metallic side bar member and the second non-metallic clip member.

12. A conveyor chain for a water treatment system, comprising:
(a) a plurality of interconnected non-metallic chain link barrel connecting elements, each of the plurality of non-metallic chain link barrel connecting elements including:
   (1) a central portion for receiving teeth of at least one sprocket; and
   (2) first and second end portions projecting from opposite ends of the central portion;
(b) a plurality of metallic side bar members for interconnecting the plurality of non-metallic chain link barrel connecting elements;
(c) a first of the metallic side bar members rotatably coupled to the first end portions of a first and a second of the non-metallic chain link barrel connecting elements;
(d) a second of the metallic side bar members rotatably coupled to the second end portions of the first and second chain link barrel connecting elements;
(e) a third of the metallic side bar members rotatably coupled to the first end portion of the first non-metallic chain link barrel connecting element;
(f) a fourth of the metallic side bar members rotatably coupled to the second end portion of the first non-metallic chain link barrel connecting element;
(g) a first non-metallic bearing member disposed about the first end portion of the first non-metallic chain link barrel connecting element between the first and third metallic side bar members;
(h) a second non-metallic bearing member disposed about the second end portion of the first non-metallic chain link barrel connecting element between the second and fourth metallic side bar members; and
(i) a plurality of non-metallic clip members secured within indentations in the first and second end portions of the non-metallic chain link barrel connecting elements, whereby the first and second non-metallic bearing members reduce friction and wear between the first and third metallic side bar members and the second and fourth metallic side bar members.

13. The chain of claim 12, wherein the chain has a pitch of 8.875 inches and said at least one sprocket has a pitch of 6 inches.

14. The chain of claim 12, further comprising:
a third non-metallic bearing member disposed about the first end portion of the first non-metallic chain link barrel connecting element between the third metallic side bar member and a first of the non-metallic clip members; and
a fourth non-metallic bearing member disposed about the second end portion of the first non-metallic chain link barrel connecting element between the fourth metallic side bar member and a second of the non-metallic clip members.

15. The chain of claim 12, wherein the third metallic side bar member is rotatably coupled to the first end portion of a third of the non-metallic chain link barrel connecting elements; and the fourth metallic side bar member is rotatably coupled to the second end portion of the third non-metallic chain link barrel connecting element.

16. The chain of claim 12, further comprising:
a plurality of metallic pin members axially extending through and substantially encapsulated by the plurality of non-metallic chain link barrel connecting elements, whereby the metallic pins increase the strength of the chain.

17. A chain for a water treatment system, comprising:
(a) a plurality of interconnected non-metallic chain link barrel connecting elements, each of the plurality of non-metallic chain link barrel connecting elements including:
   (1) a central portion for receiving teeth of at least one sprocket; and
   (2) first and second end portions projecting from opposite ends of the central portion;
(b) a plurality of metallic side bar members for interconnecting the non-metallic chain link barrel connecting elements;
(c) a first of the metallic side bar members rotatably coupled to the first end portion of a first of the plurality of chain link barrel connecting elements;
(d) a second of the metallic side bar members rotatably coupled to the second end portion of the first chain link barrel connecting element;
(e) a third of the metallic side bar members rotatably coupled to the first end portion of a second of the plurality of non-metallic chain link barrel connecting elements;
(f) a fourth of the metallic side bar members rotatably coupled to the second end portion of a second end portion of the second non-metallic chain link barrel connecting element;
(g) a first non-metallic attachment link rotatably coupled to the first end portions of the first and second non-metallic chain link barrel connecting elements; and
(h) a second non-metallic attachment link rotatably coupled to the second end portions of the first and second non-metallic chain link barrel connecting elements.

18. The chain of claim 17, further comprising:
a plurality of non-metallic bearing members disposed about the first and second end portions of the first and second non-metallic chain link barrel connecting elements between the first and second attachment links and the first, second, third and fourth metallic side bar members for reducing friction and wear between the first and second attachment links and the first, second, third and fourth metallic side bar members.

19. The chain of claim 17, further comprising:
a first metallic plate member rotatably coupled to the first end portions of the first and second non-metallic chain link barrel connecting elements; and
a second metallic plate member rotatably coupled to the second end portions of the first and second non-metallic chain link barrel connecting elements, whereby the first and second metallic plate members increase the strength of the chain.

* * * * *